US010623494B1

(12) United States Patent
Salamon (10) Patent No.: US 10,623,494 B1
(45) Date of Patent: Apr. 14, 2020

(54) SYSTEM AND METHOD FOR NON-DISRUPTIVE MOVE OF DATA AND APPLICATION STACKS

(71) Applicant: EMC IP Holding Company, LLC, Hopkinton, MA (US)

(72) Inventor: Victor Salamon, Edmonton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 91 days.

(21) Appl. No.: 15/664,625

(22) Filed: Jul. 31, 2017

(51) Int. Cl.
*H04L 29/08* (2006.01)
*G06F 13/42* (2006.01)
*H04L 12/24* (2006.01)
*H04W 84/12* (2009.01)

(52) U.S. Cl.
CPC ...... *H04L 67/1097* (2013.01); *G06F 13/4265* (2013.01); *H04L 41/12* (2013.01); *H04W 84/12* (2013.01)

(58) Field of Classification Search
CPC .................................................. H04L 67/1097
See application file for complete search history.

(56) References Cited

U.S. PATENT DOCUMENTS

| | | | | |
|---|---|---|---|---|
| 2005/0239496 A1* | 10/2005 | Sylvain | ................. | H04W 88/06 455/552.1 |
| 2006/0015636 A1* | 1/2006 | Skraba | ................... | H04L 12/66 709/232 |
| 2009/0319667 A1* | 12/2009 | Bansal | ................... | H04W 4/02 709/227 |
| 2014/0111354 A1* | 4/2014 | Hergesheimer | ......... | H04Q 9/00 340/870.02 |

* cited by examiner

*Primary Examiner* — Nicholas P Celani
(74) *Attorney, Agent, or Firm* — Brian J. Colandreo; Mark H. Whittenberger; Holland & Knight LLP (57) ABSTRACT

A method, computer program product, and computer system for identifying, by a computing device, a first connection type at a first location, wherein the computing device may reside in a transportable container coupled to the computing device and one or more storage devices, and wherein I/O communication may be routed to the computing device via the first connection type. A second connection type may be identified at a second location. The first connection type may be switched to the second connection type, wherein I/O communication may be routed to the computing device via the second connection type enabling a remote computing device to wirelessly access the computing device during transportation of the transportation container to the second location.

17 Claims, 6 Drawing Sheets

SYSTEM AND METHOD FOR NON-DISRUPTIVE MOVE OF DATA AND APPLICATION STACKS

BACKGROUND

Users (e.g., businesses) may want to move from on premises storage into cloud solutions spanning, e.g., private, public, and hybrid clouds. To enable this move, mass-migration of data and applications may be used. In some situations, rather than using substantial network resources to migrate the data to the cloud, network economics may favor the physical moving of data to, e.g., a data center (e.g., using a physical transport, such as a truck, to physically move Exabytes (EBs) of data on the physical storage devices to a data center managing storage of the cloud).

BRIEF SUMMARY OF DISCLOSURE

In one example implementation, a method, performed by one or more computing devices, may include but is not limited to identifying, by a computing device, a first connection type at a first location, wherein the computing device may reside in a transportable container coupled to the computing device and one or more storage devices, and wherein I/O communication may be routed to the computing device via the first connection type. A second connection type may be identified at a second location. The first connection type may be switched to the second connection type, wherein I/O communication may be routed to the computing device via the second connection type enabling a remote computing device to wirelessly access the computing device during transportation of the transportation container to the second location.

One or more of the following example features may be included. A third connection type may be identified at a third location. The second connection type may be switched to the third connection type, wherein I/O communication may be routed to the computing device via the third connection type enabling the remote computing device to wirelessly access the computing device during transportation of the transportation container to the third location. At least one of the first and second connection type may be identified at a fourth location. The third connection type may be switched to at least one of the first and second connection type. At least one of an application and data may be replicated between the computing device and the remote computing device during transportation of the transportation container to at least one of the second and third location. The first connection type may include a physical LAN connection. The second connection type may include a wireless LAN connection. Third connection type may include a wireless WAN connection.

In another example implementation, a computing system may include one or more processors and one or more memories configured to perform operations that may include but are not limited to identifying a first connection type at a first location, wherein the computing device may reside in a transportable container coupled to the computing device and one or more storage devices, and wherein I/O communication may be routed to the computing device via the first connection type. A second connection type may be identified at a second location. The first connection type may be switched to the second connection type, wherein I/O communication may be routed to the computing device via the second connection type enabling a remote computing device to wirelessly access the computing device during transportation of the transportation container to the second location.

One or more of the following example features may be included. A third connection type may be identified at a third location. The second connection type may be switched to the third connection type, wherein I/O communication may be routed to the computing device via the third connection type enabling the remote computing device to wirelessly access the computing device during transportation of the transportation container to the third location. At least one of the first and second connection type may be identified at a fourth location. The third connection type may be switched to at least one of the first and second connection type. At least one of an application and data may be replicated between the computing device and the remote computing device during transportation of the transportation container to at least one of the second and third location. The first connection type may include a physical LAN connection. The second connection type may include a wireless LAN connection. Third connection type may include a wireless WAN connection.

In another example implementation, a computer program product may reside on a computer readable storage medium having a plurality of instructions stored thereon which, when executed across one or more processors, may cause at least a portion of the one or more processors to perform operations that may include but are not limited to identifying a first connection type at a first location, wherein the computing device may reside in a transportable container coupled to the computing device and one or more storage devices, and wherein I/O communication may be routed to the computing device via the first connection type. A second connection type may be identified at a second location. The first connection type may be switched to the second connection type, wherein I/O communication may be routed to the computing device via the second connection type enabling a remote computing device to wirelessly access the computing device during transportation of the transportation container to the second location.

One or more of the following example features may be included. A third connection type may be identified at a third location. The second connection type may be switched to the third connection type, wherein I/O communication may be routed to the computing device via the third connection type enabling the remote computing device to wirelessly access the computing device during transportation of the transportation container to the third location. At least one of the first and second connection type may be identified at a fourth location. The third connection type may be switched to at least one of the first and second connection type. At least one of an application and data may be replicated between the computing device and the remote computing device during transportation of the transportation container to at least one of the second and third location. The first connection type may include a physical LAN connection. The second connection type may include a wireless LAN connection. Third connection type may include a wireless WAN connection.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
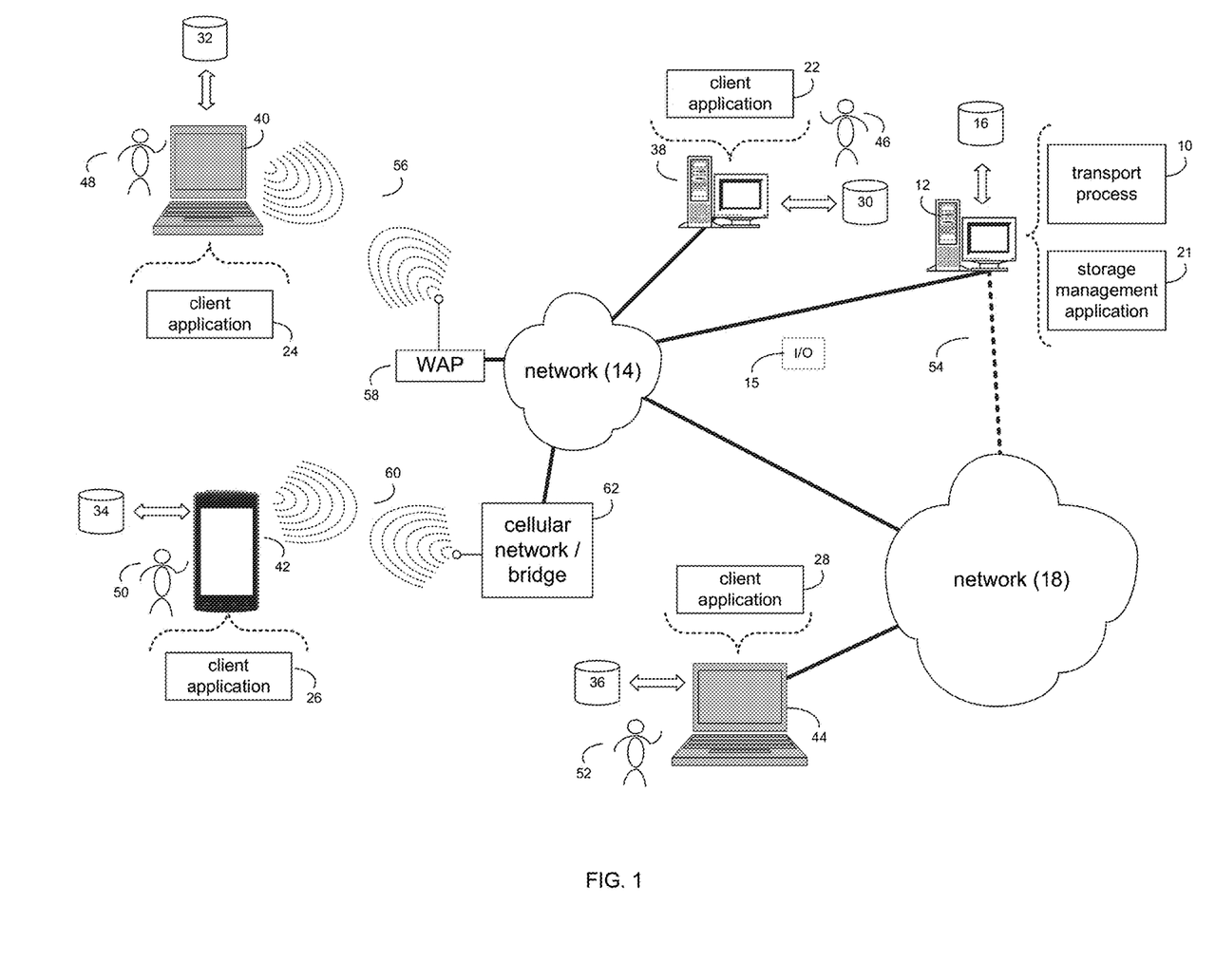
FIG. 1 is an example diagrammatic view of a transport process coupled to an example distributed computing network according to one or more example implementations of the disclosure.

Referring now to the example implementation of FIG. 1, there is shown transport process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, an transport process, such as transport process 10 of FIG. 1, may identify, by a computing device, a first connection type at a first location, wherein the computing device may reside in a transportable container coupled to the computing device and one or more storage devices, and wherein I/O communication may be routed to the computing device via the first connection type. A second connection type may be identified at a second location. The first connection type may be switched to the second connection type, wherein I/O communication may be routed to the computing device via the second connection type enabling a remote computing device to wirelessly access the computing device during transportation of the transportation container to the second location.

In some implementations, the instruction sets and subroutines of transport process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, transport process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from Dell EMC™ of Hopkinton, Mass. In some implementations, other cloud computing environments may be used without departing from the scope of the disclosure.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, transport process 10 and/or storage management application 21 may be accessed via one or more of client applications 22, 24, 26, 28. In some implementations, transport process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within transport process 10, a component of transport process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of transport process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of transport process 10 (and vice versa). Accordingly, in some implementations, transport process 10 may be a purely server-side application, a purely client-side application, or a hybrid server-side/client-side application that is cooperatively executed by one or more of client applications 22, 24, 26, 28 and/or transport process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, transport process 10, and storage management application 21, taken singly or in any combination, may effectuate some or all of the same functionality, any description of effectuating such functionality via one or more of client applications 22, 24, 26, 28, transport process 10, storage management application 21, or combination thereof, and any described interaction(s) between one or more of client applications 22, 24, 26, 28, transport process 10, storage management application 21, or combination thereof to effectuate such functionality, should be taken as an example only and not to limit the scope of the disclosure.

In some implementations, one or more of users 46, 48, 50, 52 may access computer 12 and transport process 10 (e.g., using one or more of client electronic devices 38, 40, 42, 44) directly through network 14 or through secondary network 18. Further, computer 12 may be connected to network 14 through secondary network 18, as illustrated with phantom link line 54. Transport process 10 may include one or more user interfaces, such as browsers and textual or graphical user interfaces, through which users 46, 48, 50, 52 may access transport process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Data Storage System:

Referring also to the example implementation of FIGS. 2, and 3a-3b, (e.g., where computer 12 may be configured as a data storage system), for example purposes only, computer 12 will be described as being a network-based storage system that includes a plurality of electro-mechanical back-end storage devices. However, this is for example purposes only and is not intended to be a limitation of this disclosure, as other configurations are possible and are considered to be within the scope of this disclosure. For example and as discussed above, computer 12 may be a personal computer that includes a single electro-mechanical storage device.

Figure 2:
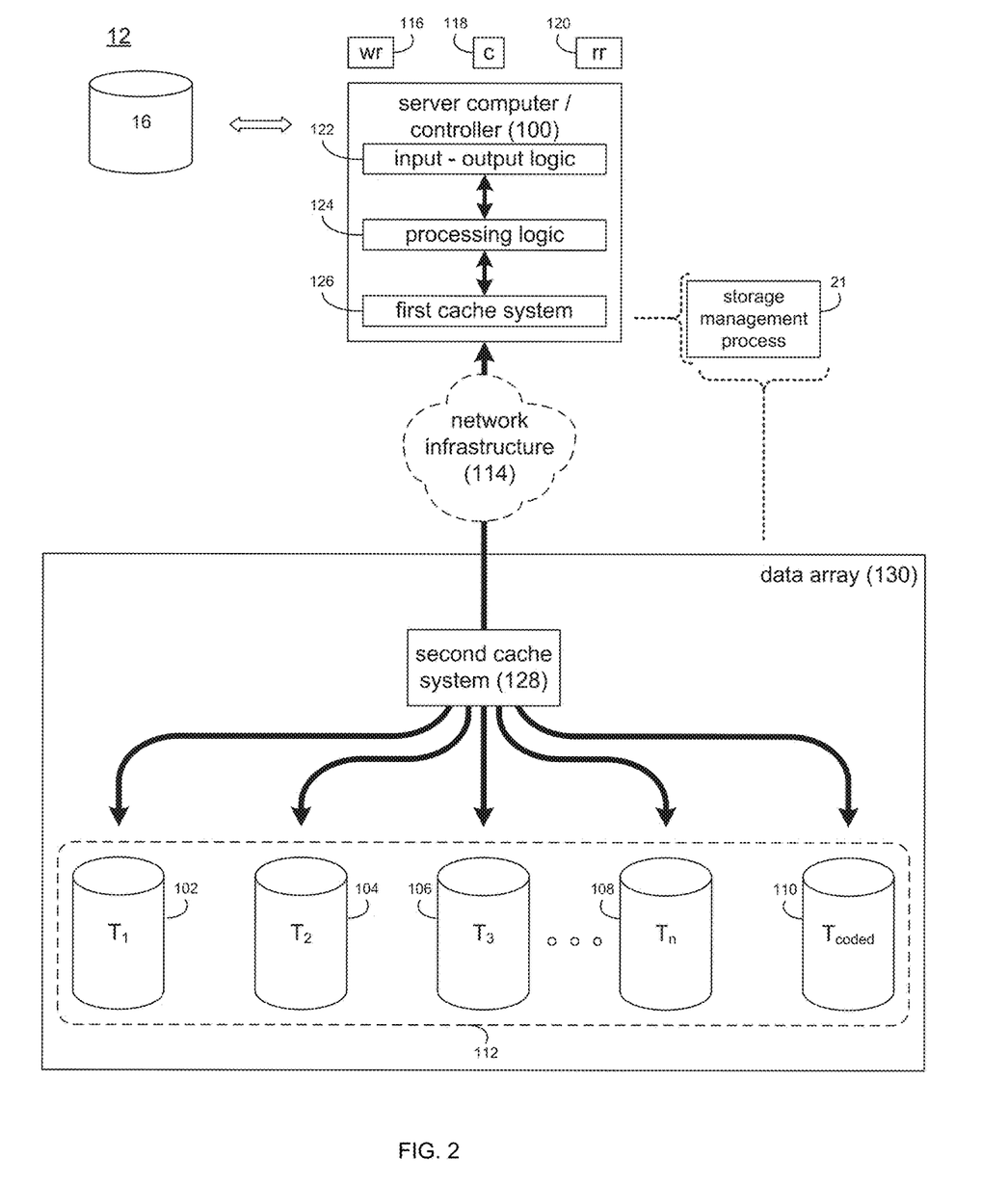
FIG. 2 is an example diagrammatic view of a computer of FIG. 1 according to one or more example implementations of the disclosure.
Figure 3A:
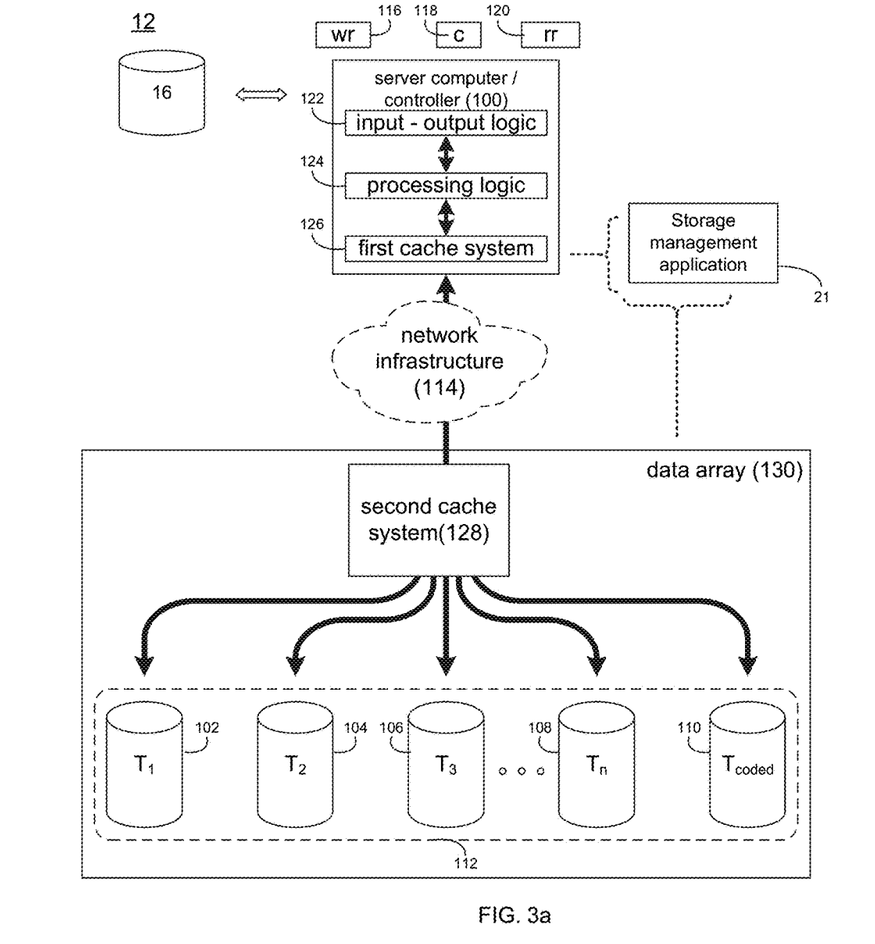
FIG. 3a is an example diagrammatic view of a storage target of FIG. 2 according to one or more example implementations of the disclosure.
Figure 3B:
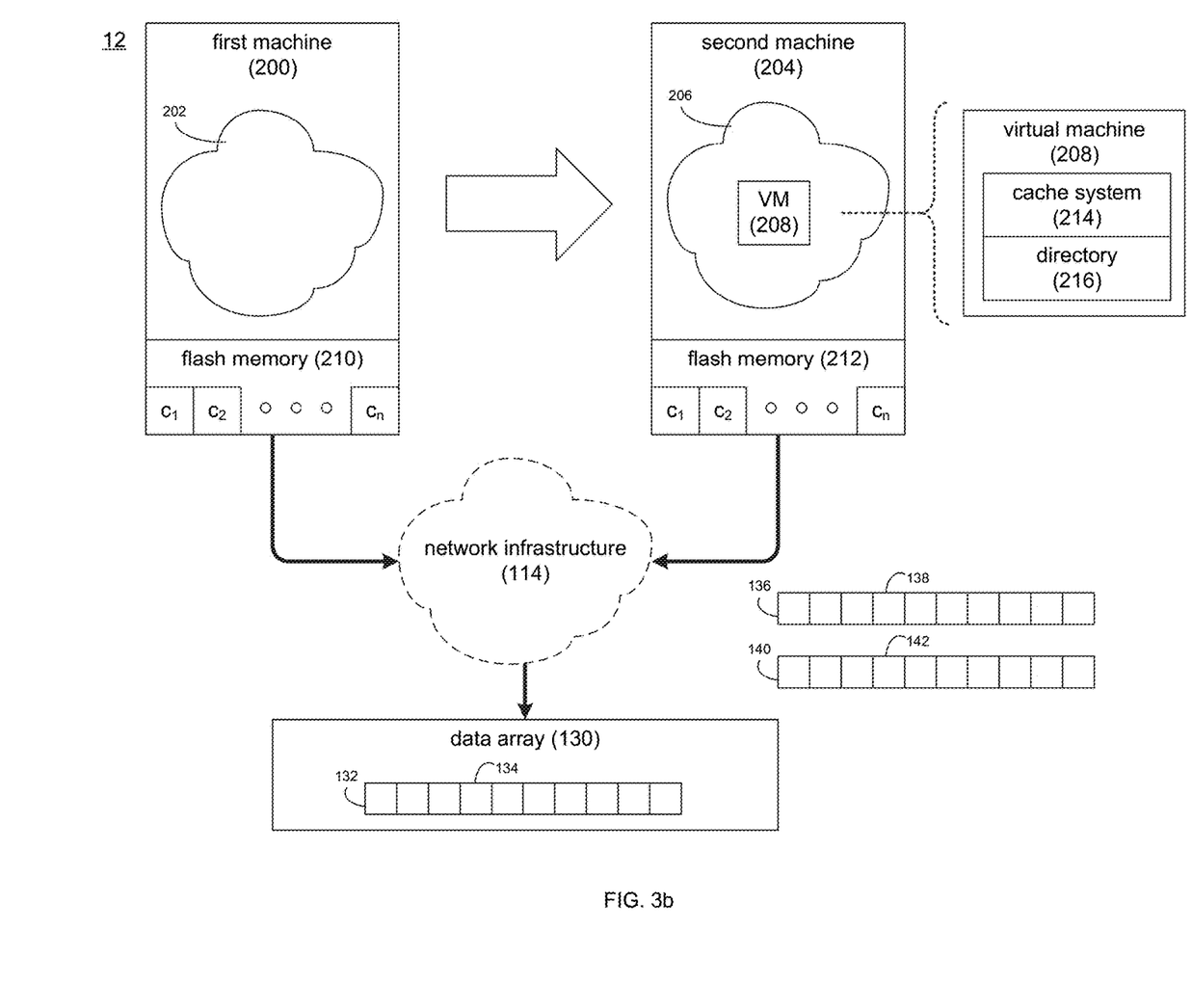
FIG. 3b is an example diagrammatic view of a storage system layout according to one or more example implementations of the disclosure.

Referring also to FIG. 2, computer 12 may include a server computer/controller (e.g., server computer/controller 100), and a plurality of storage targets T1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. In some implementations, one or more of storage targets 102, 104, 106, 108 may be configured as a RAID 0 array, or as a RAID 1 array, in which data is mirrored between storage targets. By mirroring data between storage targets, a level of high availability may be achieved as multiple copies of the data are stored within computer 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3 array, RAID 4 array, RAID 5 array, RAID 6 array, etc.

While in this particular example, computer 12 is shown to include four storage targets (e.g., storage targets 102, 104, 106, 108), this is for example purposes only and is not intended to be a limitation of this disclosure. For example, the actual number of storage targets may be increased or decreased depending upon, e.g., the level of redundancy/performance/capacity desired.

In some implementations, computer 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive (or other storage device drive) that is used to store parity data within a RAID array.

While in this particular example, computer 12 is shown to include one coded target (e.g., coded target 110), this is for example purposes only and is not intended to be a limitation of this disclosure. For example, the actual number of coded targets may be increased or decreased depending upon, e.g., the level of redundancy/performance/capacity desired.

Examples of storage targets 102, 104, 106, 108 and coded target 110 may include one or more electro-mechanical hard disk drives (or other storage device drives), wherein a combination of storage targets 102, 104, 106, 108 and coded target 110 may form non-volatile, electro-mechanical memory system 112.

The manner in which computer 12 is implemented may vary depending upon, e.g., the level of redundancy/performance/capacity desired. For example, computer 12 may be a RAID device in which server computer/controller 100 is a RAID controller card and storage targets 102, 104, 106, 108 and/or coded target 110 are individual "hot-swappable" drives. An example of such a RAID device may include but is not limited to a NAS device. In some implementations, computer 12 may be configured as a SAN, in which server computer/controller 100 may be, e.g., a server computer and each of storage targets 102, 104, 106, 108 and/or coded target 110 may be a RAID device and/or computer-based drive. Further still, one or more of storage targets 102, 104, 106, 108 and/or coded target 110 may be a SAN.

In the event that computer 12 is configured as a SAN, the various components of computer 12 (e.g., server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Computer 12 may execute all or a portion of storage management process 21 and/or transport process 10. An example of storage management process 21 and/or transport process 10 may include but is not limited to a VNX™ system offered by Dell EMC™ of Hopkinton, Mass. The instruction sets and subroutines of storage management process 21, which may be stored on a storage device (e.g., storage device 16) coupled to server computer/controller 100, may be executed by one or more processors and one or more memory architectures included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various JO requests (e.g. I/O request 15) may be generated. For example, these I/O requests may be sent from client applications 22, 24, 26, 28 to computer 12. Additionally/alternatively and when server computer/controller 100 is configured as an application server, these I/O requests may be internally generated within server computer/controller 100. Examples of I/O request 15 may include but are not limited to data write request 116 (e.g., a request that content 118 be written to computer 12) and data read request 120 (e.g., a request that content 118 be read from computer 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to computer 12 may be received by input-output logic 122 (e.g., from network 14 and/or network 18) and processed by processing logic 124 (e.g., via storage management application 21). Additionally/alternatively and when server computer/controller 100 is configured as an application server, content 118 to be written to computer 12 may be internally generated by server computer/controller 100 (e.g., via storage management application 21). As will be discussed below, processing logic 124 may initially store content 118 within first cache system 126.

Depending on the manner in which first cache system 126 is configured, processing logic 124 may immediately write content 118 to second cache system 128/non-volatile, electro-mechanical memory system 112 (e.g., if first cache system 126 is configured as a write-through cache) or may subsequently write content 118 to second cache system 128/non-volatile, electro-mechanical memory system 112 (e.g., if first cache system 126 is configured as a write-back cache). Additionally, and in some configurations, processing logic 124 (e.g., via storage management application 21) may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or a NAS/SAN controller, processing logic 124 may calculate and store coded data on coded target 110. However, if processing logic 124 was included within, e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of I/O requests (e.g., IO request 15), the overall performance of computer 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of I/O requests (e.g., I/O request 15), the overall performance of computer 12 may be enhanced.

As discussed above, the instruction sets and subroutines of storage management application 21, which may be stored on storage device 16 included within computer 12, may be executed by one or more processors and one or more memory architectures included within computer 12. Accordingly, in addition to being executed on server computer/controller 100, some or all of the instruction sets and subroutines of storage management application 21 may be executed by one or more processors and one or more memory architectures included within data array 130.

Figure 4:
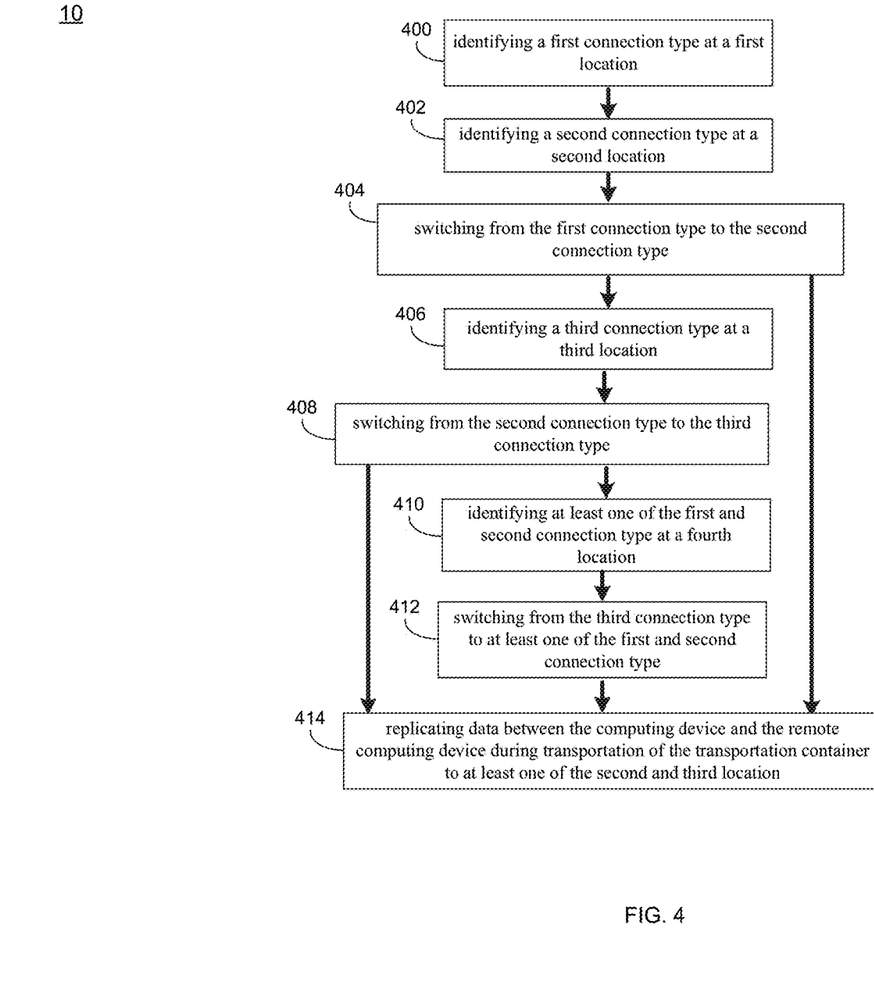
FIG. 4 is an example flowchart of a transport process according to one or more example implementations of the disclosure.

Referring also to the example implementation of FIG. 4, assume for the following example that first server computer/controller 200 is a physical device that is executing first virtual machine operating environment 202. An example of such a virtual machine operating environment may be a hypervisor, which is an instantiation of an operating system that allows for multiple virtual machines to operate within a single physical device (e.g., first server computer/controller 200). Further, second server computer/controller 204 may be a physical device that is executing second virtual machine operating environment 206 (e.g., a hypervisor).

For this example, further assume that first virtual machine operating environment 202 within first server computer/controller 200 is executing a virtual machine (e.g., virtual machine 208). While first virtual machine operating environment 202 is shown to be executing only a single virtual machine, this is for illustrative purposes only and is not intended to be a limitation of this disclosure, as the number of virtual machines executed within first virtual machine operating environment 202 may increase/decrease depending upon need/loading.

Assume further that first server computer/controller 200 and second server computer/controller 204 each includes a non-volatile memory system (e.g., flash memory devices 210, 212, respectively) that first server computer/controller 200 and second server computer/controller 204 may use for cache storage. Each of flash memory devices 210, 212 may be compartmentalized (e.g., into "n" portions, wherein a unique portion of flash memory device 210 may be assigned to each virtual machine running on first virtual machine operating environment 202 and a unique portion of flash memory device 212 may be assigned to each virtual machine running on second virtual machine operating environment 206.

Virtual machine 208 may be associated with cache system 214, which may include content directory 216. Accordingly, virtual machine 208 may use cache system 214, which may be implemented using flash memory device 210. Content directory 216 may be configured to identify the location of specific pieces of content included within (in this example) flash memory device 210 and their corresponding pieces of data within data array 130.

Assume for example purposes only that data file 132 is stored within data array 130. Further assume that data file 132 is a larger data file, examples of which may include larger database files.

Accordingly, in the event that a read request (e.g., read request 120) is received on a host (e.g., server computer/controller 200) concerning data file 130, it may be impractical (e.g., from a performance perspective and/or from a capacity perspective) to cache the entirety of data file 132 within the cache system (e.g., cache system 214) of the host (e.g., server computer/controller 200). Accordingly, data file 132 may be configured as a multi-portion data file in which only the portion of the data file requested by a specific host (e.g., server computer/controller 200) is cached within the cache system (e.g., cache system 214) of the host (e.g., server computer/controller 200) upon the processing of read request 120).

For example, and concerning read requests, assume that read request 120, which may be processed by server computer/controller 200, requests a specific one megabyte portion of data file 132 (e.g., portion 134). Accordingly, the host (e.g., server computer/controller 200) may retrieve from data array 130 only portion 134 of data file 132, which may be stored within the cache system (e.g., cache system 214) of the host (e.g., server computer/controller 200) and provided to the entity requesting portion 134 of data file 132.

Further, write requests (e.g., write request 116) received on a host (e.g., server computer/controller 200) concerning data file 132 may be configured so that the data (e.g., content 118) associated with the write request (e.g., write request 116) only represents a specific portion (e.g., portion 134) of data file 132 that is to be written to data array 130.

For example, and concerning write requests, assume that write request 116, which is processed by server computer/controller 200, requests that a one megabyte portion of data file 132 (e.g., content 118) be written to data array 130. Accordingly, the host (e.g., server computer/controller 200) may receive content 118, which may be stored within the cache system (e.g., cache system 214) of the host (e.g., server computer/controller 200) and provided to data array 130 for storage as e.g., portion 134 of data file 132.

Referring also to the example implementation of FIG. 4, storage management application 21 may associate 250 a tracking file (e.g., tracking file 136) with data file 132. Tracking file 136 may be stored on data array 130. Additionally/alternatively, tracking file 136 may be locally cached on the physical machine processing the write request (e.g., server computer/controller 200), wherein the locally cached copy of tracking file 136 may be modified and then (once the modification is complete) the modified copy of tracking file 136 may be provided to data array 130 so that it may overwrite the original (e.g., unmodified) version of tracking file 136 included within data array 130.

Tracking file 136 may be configured to indicate the status of each portion of data file 132. For example, tracking file 136 may be configured so that tracking file 136 indicates if changes were made to a specific portion of data file 132 (e.g., due to the processing of write request 116) and the identity of the host (e.g., server computer/controller 200) that made those changes. For example, assume for example purposes that data file 132 is divided into ten portions. Accordingly, tracking file 136 may be configured to include ten 8-bit indicators, wherein a unique 8-bit indicator is assigned to each of the ten portions of data file 132. In the event that a change is made to one of the ten portions of data file 132, the unique 8-bit indicator that is assigned to the changed portion of data file 132 may be updated to indicate the identity of the host (e.g., first machine 200) that made the change. As in this example, the indicators are eight bits in length, two-hundred-fifty-six unique hosts may be identified within each unique 8-bit indicator.

Continuing with the above-stated example, assume that server computer/controller 200 processes write request 116. Accordingly, storage management application 21 may modify 252 the appropriate portion of data file 132. For example, storage management application 21 may overwrite portion 134 of data file 132 to include content 118 defined within write request 116. As, in this example, server computer/controller 200 is executing first virtual machine operating environment 202 (which is executing virtual machine 208), virtual machine 208 may modify 252 the appropriate portion of data file 132.

Further, storage management application 21 may update 254 tracking file 136 to reflect the modification of the appropriate portion of data file 132. For example, storage management application 21 may update 254 unique 8-bit indicator 138 (that is associated with portion 134 of data file 132) to indicate that portion 134 of data file 132 was modified by (in this example) server computer/controller 200.

Assume that for some reason (e.g., maintenance/load balancing), storage management application 21 receives an indication, on virtual machine 208, that virtual machine 208 is going to be migrated. Specifically, through the use of products like VMware, virtual machines may be migrated (from a first physical device to a second physical device) without being shut down (which is commonly referred to as a live migration or vmotion).

As noted above, users (e.g., businesses) may want to move from on premises storage into cloud solutions spanning, e.g., private, public, and hybrid clouds. Traditional migration of data using network resources may be used. However, some data migration may be too large to be practical. For example, some businesses may have Exabytes (EBs) of data to migrate. For reference, one EB is one quintillion bytes or $10^{18}$ bytes, which is a size that may make use of traditional network migration prohibitive. As an alternative to using network resources to enable the migration of data, physical mass-migration of the storage devices storing the data and applications may be used. In some situations, rather than using substantial network resources to migrate the data to the cloud, network economics may favor the physical moving of data to, e.g., a data center (e.g., using a physical transport, such as a truck, to physically move EBs of data on the physical storage devices to a data center managing storage of the cloud). However, generally, this solution may not allow some or all of the entire business application (or other applications) to run or be accessed remotely while in transport (which may take hours, days, months), and may, e.g., lead to costly data and application unavailability, may introduce a single point of failure as the data is not live-replicated during transport (e.g., if the physical vehicle moving the data would fail, the data being transported on it may be lost), and may be more costly as such transportation is generally customized (e.g., there may be a significant cost/complexity to the loading of physical storage devices with data onto and off of the transport) and does not make use of transportation networks (e.g., bus, truck, plane, rail, etc.). Such moves may be even riskier for time sensitive data moves (e.g., an oil company vessel pulling seismographic data from the ocean floor that may need to be processed within 24 hours in New York supercenters for course corrections the next day, a film studio shooting large amounts of a digital movie in remote locations (e.g., New Zealand) for data to be edited in another time zone (e.g., Hollywood, Calif.).

As will be discussed below, transport process 10 may at least help, e.g., improvement data storage and transport technology, necessarily rooted in computer technology in order to overcome an example and non-limiting problem specifically arising in the realm of near continuous data access associated with, e.g., the physical transportation of storage devices during some or all of their transportation from point A to point B.

Figure 5:
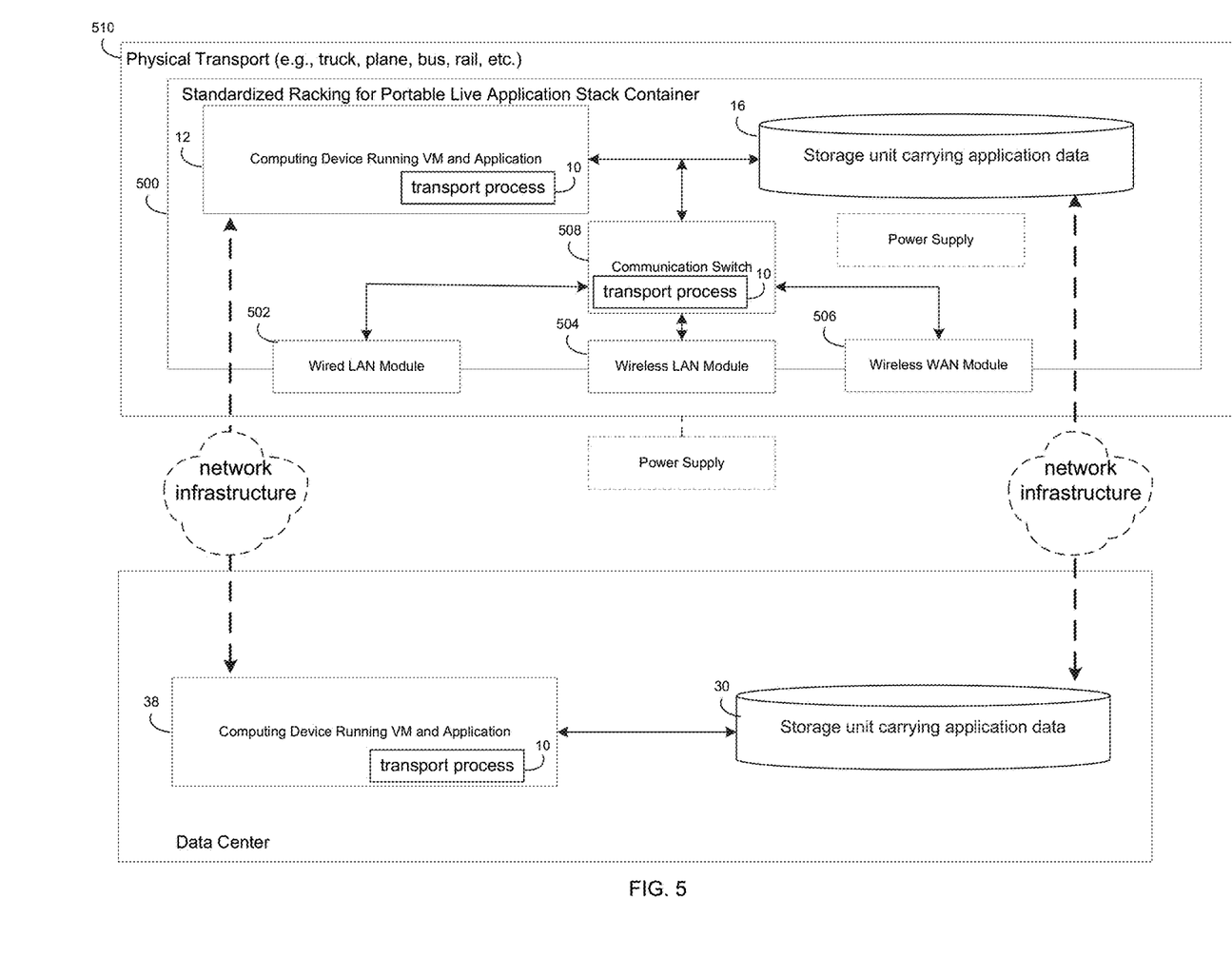
FIG. 5 is an example diagrammatic view of a portable live application stack container according to one or more example implementations of the disclosure.

The Transport Process:

As discussed above and referring also at least to the example implementations of FIGS. 4-5, transport process 10 may identify 400, by a computing device, a first connection type at a first location, wherein the computing device may reside in a transportable container coupled to the computing device and one or more storage devices, and wherein I/O communication may be routed to the computing device via the first connection type. Transport process 10 may identify 402 a second connection type at a second location. Transport process 10 may switch 404 from the first connection type to the second connection type, wherein I/O communication may be routed to the computing device via the second connection type enabling a remote computing device to wirelessly access the computing device during transportation of the transportation container to the second location.

As noted above, computing device 12 may reside in a transportable container. Referring also to the example implementation of FIG. 5, an example transportable container (e.g., container 500) is shown. In the example, container 500 may generally be described as a Portable Live Application Stack Container (PLASC), although any variation of container 500 may be used that may provide the example and non-limiting benefits of the present disclosure. In some implementations, container 500 may be described as a hyper-converged physical container that may (e.g., via transport process 10) run and access a business application stack while in transport. Broadly speaking, a business application stack may generally contain the storage portion (e.g., volumes/LUNs/disks via storage device 16) and the computer portion (e.g., VMs/storage system via computer 12), which may collectively carry business applications, their data, operating systems, platforms, etc. to enable transport process 10 to run and provide access to the business application even when mobile (e.g., as a main site, a failover site, etc.). It will be appreciated that "business" when used with business application stack or business application may refer to any type of user application or application stack, and need not be required to specifically relate to a business.

In some implementations, the application stack and its data may be physically migrated without disrupting availability from a source (e.g., a data center where the data is originally stored and/or processed) to the physical transport (e.g., the physical means for transportation), and from the physical transport to a destination (e.g., a data center managing storage of the cloud and/or with superior data processing resources, etc.).

In some implementations, a physical specification (e.g., rack enclosure sizes, mobility/rails, shake tolerance, etc.) may be used by multiple example physical transport types (e.g., trucks, buses, airplanes, railroad, etc.). In some implementations, container 500 may itself be considered a computing device and/or may be electronically coupled to interface with computer 12. In some implementations, as will be discussed below, container 500 may include one or more standard communication modules (e.g., SCSI capable IB, Fiber Channel, IP, both wired and wireless, etc.) enabling access to the application and data while on the physical transport. For instance, in some implementations, container 500 may include a wired LAN module (e.g., wired LAN module 502), a wireless LAN module (e.g., wireless LAN module 504), and/or a wireless WAN module (e.g., wireless WAN module 506). It will be appreciated that other types of wired and wireless communication modules may also be used without departing from the scope of the disclosure.

In some implementations, container 500 may include a communication switch (e.g., switch 508). In some implementations, switch 508 may include a communication router to switch between higher and lower bandwidth communication channels (e.g., higher bandwidth communication channels when the physical transport is near a data center, and a lower bandwidth communication channel while on the move). For instance, switch 508 may be used to route communications (e.g., I/O requests 15) to and from computer 12 via each of the communication modules (and therefore at least in part enabling access to the application and data while on the physical transport). It will be appreciated that more or less communication modules, as well as differing types of communication modules and/or switches, may be used without departing from the scope of the disclosure. As will be discussed below, transport process 10 may be used to optimize the transport throughput and minimize risk to business availability.

In some implementations, transport process 10 may identify 400, by a computing device, a first connection type at a first location, wherein the computing device may reside in a transportable container coupled to the computing device and one or more storage devices, and wherein I/O communication may be routed to the computing device via the first connection type. For instance, assume for example purposes only that a business (or a user) desires to physically migrate their data from on premises storage into cloud solutions spanning, e.g., private, public, and hybrid clouds, at a remote site (e.g., a data center). In the example, container 500 may be used for the transport, and transport process 10 may identify 400 a first connection type at a first location (e.g., at the source location or data center where the data storage originated). In some implementations, transport process 10 may identify 400 the first connection type by detecting availability of the first connection type. For instance, in some implementations, the first connection type may include a physical LAN connection. In the example, transport process 10 may identify 400 the physical LAN connection (e.g., via wired LAN module 502) via the physical coupling to container 500, and may enable any I/O communications to/from container 500 to be routed via the physical LAN connection. For instance, transport process 10 (e.g., via container 500) may be enabled to continue running (e.g., either in container 500 only, and/or live-replicate the business application/VM and data between the source data center and container 500, and/or receive/send other I/O communications) through the high speed LAN connection as container 500 is being prepared for physical transport.

In some implementations, transport process 10 may identify 402 a second connection type at a second location. For instance, assume for example purposes only that the physical transport (e.g., physical transport 510) is a truck, and that the truck arrives at the truck bay doors of the source data center, where the second location may be a location such that the wired LAN connection is no longer available. In the example, container 500 may be disconnected from the physical LAN connection as it is being loaded onto the truck. In some implementations, transport process 10 may identify 402 the second connection type by detecting availability of the second connection type. For instance, in some implementations, the second connection type may include a wireless LAN connection. In the example, transport process 10 may identify 402 the wireless LAN connection (e.g., via wireless LAN module 504) when transport process 10 detects the availability for the wireless LAN connection to be connected to container 500.

In some implementations, transport process 10 may switch 404 from the first connection type to the second connection type, wherein I/O communication may be routed to the computing device via the second connection type enabling a remote computing device to wirelessly access the computing device during transportation of the transportation container to the second location. For example, once transport process 10 has identified 402 the availability of the wireless LAN connection (and/or when transport process 10 detects that the wired LAN connection is no longer available/connected to container 500), transport process 10 may switch 404 (via switch 508) from the wired LAN connection to the wireless LAN connection, which may enable any I/O communications to/from container 500 to be routed via the wireless LAN connection instead of the wired LAN connection. For instance, transport process 10 (e.g., via container 500) may be enabled to continue running (e.g., either in container 500 only, and/or live-replicate the business application/VM and data between the source data center and container 500, and/or receive/send other I/O communications) through the lower bandwidth wireless LAN connection with little or no interruption as container 500 is disconnected from the wired LAN connection for loading onto the truck for physical transport.

In some implementations, transport process 10 may identify 406 a third connection type at a third location. For instance, assume for example purposes only that container 500 has been loaded onto the truck, and that the truck begins its journey to the destination data center, where the third location may be a location geographically remote from the source data center such that the wireless LAN connection is no longer available. In the example, container 500 may have moved out of range of the wireless LAN connection, and therefore may be disconnected from the wireless LAN connection. In some implementations, transport process 10 may identify 406 the third connection type by detecting availability of the third connection type. For instance, in some implementations, the third connection type may include a wireless WAN connection. In the example, transport process 10 may identify 406 the wireless WAN connection when transport process 10 detects the availability for the wireless WAN connection (e.g., via wireless WAN module 506) to be connected to container 500 (and/or when transport process 10 detects that the wireless LAN connection is no longer available/connected to container 500).

In some implementations, transport process 10 may switch 408 from the second connection type to the third connection type, wherein I/O communication may be routed to the computing device via the third connection type enabling the remote computing device to wirelessly access the computing device during transportation of the transportation container to the third location. For example, once transport process 10 has identified 406 the availability of the wireless WAN connection (and/or when transport process 10 detects that the wireless LAN connection is no longer available/connected to container 500), transport process 10 may switch 406 (via switch 508) from the wireless LAN connection to the wireless WAN connection (e.g., via wireless WAN module 506), which may enable any I/O communications to/from container 500 to be routed via the wireless WAN connection instead of the wireless LAN connection. For instance, transport process 10 (e.g., via container 500) may be enabled to continue running (e.g., either in container 500 only, and/or live-replicate the business application/VM and data between the source data center and container 500, and/or receive/send other I/O communications) through the lower bandwidth wireless WAN connection with little or no interruption as container 500 is disconnected from the wireless LAN connection while container 500 is continuing its journey on the truck to the destination data center.

In some implementations, transport process 10 may identify 410 at least one of the first and second connection type at a fourth location. For instance, assume for example purposes only that container 500 (via the truck) has arrived at the bay doors of the destination data center (e.g., the fourth location). In the example, container 500 may have moved within range of a wireless LAN connection at the destination data center, and therefore may be disconnected from the wireless WAN connection. In some implementations, transport process 10 may identify 410 the second connection type by detecting availability of the second connection type. In the example, transport process 10 may identify 410 the wireless LAN connection when transport process 10 detects the availability for the wireless LAN connection (e.g., via wireless LAN module 504) to be connected to container 500 (and/or when transport process 10 detects that the wireless WAN connection is no longer available/connected to container 500).

In some implementations, transport process 10 may switch 412 from the third connection type to at least one of the first and second connection type. For example, once transport process 10 has identified 410 the availability of the wireless LAN connection (and/or when transport process 10 detects that the wireless WAN connection is no longer available/connected to container 500), transport process 10 may switch 412 (via switch 508) from the wireless WAN connection to the wireless LAN connection (e.g., via wireless LAN module 504), which may enable any I/O communications to/from container 500 to be routed via the wireless LAN connection instead of the wireless WAN connection. For instance, transport process 10 (e.g., via container 500) may be enabled to continue running (e.g., either in container 500 only, and/or live-replicate the business application/VM and data between the source data center and container 500, and/or receive/send other I/O communications) through the lower bandwidth wireless LAN connection with little or no interruption as container 500 is disconnected from the wireless WAN connection while container 500 is being loaded off of the truck at the destination data center.

In the example, further assume that container 500 has now been offloaded from the truck and is now in a location (e.g., the fourth location). In the example, once transport process 10 has identified 410 the availability of the wired LAN connection, transport process 10 may switch 412 (via switch 508) from the wireless LAN connection to the wired LAN connection (e.g., via wired LAN module 502), which may enable any I/O communications to/from container 500 to be routed via the wired LAN connection instead of the wireless LAN connection. For instance, transport process 10 (e.g., via container 500) may be enabled to continue running (e.g., either in container 500 only, and/or live-replicate the business application/VM and data between the source data center and container 500, and/or receive/send other I/O communications) through the higher bandwidth wired LAN connection with little or no interruption as container 500 is disconnected from the wireless LAN connection while container 500 is being loaded off of the truck at the destination data center.

While one or more implementations have been described switching in a specific order (e.g., wired LAN to wireless LAN to wireless WAN to wireless LAN to wired LAN), it will be appreciated that more or less switching and in any order of switching may be possible. For instance, in some implementations, transport process 10 may identify 410 the first connection type at the fourth location and may switch 412 from the third connection type to the first connection type. For instance, assume for example purposes only that container 500 (via the truck) has arrived at the bay doors of the destination data center. In the example, container 500 may have moved within range of a wireless LAN connection at the destination data center, and therefore may be disconnected from the wireless WAN connection. However, assume instead that even though the wireless LAN has been identified 402/410, transport process 10 determines that the current bandwidth of the wireless WAN connection is greater than the current bandwidth of the wireless LAN connection. In the example, rather than switching 412 to the wireless LAN connection, transport process 10 may instead maintain its connection to the wireless WAN.

In the example, further assume that container 500 has now been offloaded from the truck and is now in a location (e.g., in this example the fourth location may be the location where container 500 may be connected to the wired LAN connection of the destination data center). In the example, once transport process 10 has identified 410 the availability of the wired LAN connection (e.g., via the physical connection to container 500), transport process 10 may switch 412 (via switch 508) from the wireless WAN connection to the wired LAN connection (e.g., via wired LAN module 502), which may enable any I/O communications to/from container 500 to be routed via the wired LAN connection instead of the wireless WAN connection. For instance, transport process 10 (e.g., via container 500) may be enabled to continue running (e.g., either in container 500 only, and/or live-replicate the business application/VM and data between the source data center and container 500, and/or receive/send other I/O communications) through the higher bandwidth wired LAN connection with little or no interruption as container 500 is disconnected from the wireless WAN connection while container 500 is being loaded off of the truck at the destination data center.

In some implementations, depending on whether the wireless LAN or the wireless WAN has the greater bandwidth, transport process 10 may switch back and forth between them (e.g., until the wired LAN connection is connected).

In the example, now that container 500 is physically connected to the wired LAN, a user (e.g., an administrator) may now decide to, e.g., migrate the business application/VM and data from container 500 onto the destination data center (after which the business application/VM and data effectively may be considered as having been live-replicated between data centers), to reuse container 500 for another live application and data transport, etc.

In some implementations, transport process 10 may replicate 414 at least one of an application and data the data between the computing device and the remote computing device during transportation of the transportation container to at least one of the second and third location. For instance, at any given time during the physical transportation of container 500 from the first location to the fourth location (e.g., the location at the source data center when container 500 is connected to the wired LAN connection and the location at the destination data center when container 500 is connected to the wired LAN connection), container 500 (e.g., via transport process 10) may be enabled to receive/send I/O communications, including but not limited to live replication 414 of the data (e.g., the business application/VM portion and/or its associated data portion) between container 500 and the source and/or destination data center with little or no interruption. In some implementations, live replication 414 (as shown via dashed arrows in FIG. 5) for business application/VM data replication may be implemented using, e.g., the above-noted VMware replication, High Availability (HA) replication, and/or Fault Tolerant (FT) replication, and live replication 414 for the associated data may be implemented using, e.g., the above-noted VPLEX active-active.

By implementing one or more aspects of the present disclosure, transport process 10 may ensure that there is little or no loss of access to data (e.g., business data, application data) or to the applications themselves during the physical move that may take hours, days, weeks, months, etc., and the application (via transport process 10) may be enabled to use the "follow the sun" model, where the application moves locally to the data center where most processing may occur as a function of time. Moreover, during the physical transport, the application may survive failure of either the data center or its transporting replica without data or access loss, and the cost to physically move the data (and/or the applications) may be reduced as it makes use of existing capacity on existing physical transport networks that may not require special hardware to transport the storage devices safely.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
identifying, by a computing device, a first connection type at a first location, wherein the computing device resides in a transportable container coupled to the computing device and one or more storage devices, and wherein I/O communication is routed to the computing device via the first connection type;
identifying a second connection type at a second location, wherein the second location is a location where the first connection type is no longer available to the computing device;
switching from the first connection type to the second connection type, wherein I/O communication is routed to the computing device via the second connection type enabling a remote computing device to wirelessly access the computing device during transportation of the transportation container to the second location;
identifying a third connection type at a third location, the third connection type being wireless;
identifying at least one of the first and second connection type at a fourth location;
switching from the second connection type to the third connection type;
switching from the third connection type to at least one of the first and second connection type in response to the transportable container moving within range of at least one of the first and second connection type and determining a current bandwidth of the third connection type is less than a current bandwidth of at least one of the first and second connection type; and
in response to identifying that the first connection type is available via a physical connection to the transportable container, switching from the third connection type to the first connection type and enabling, at least in part, receiving and sending of at least a second I/O communication through the first connection without being disconnected from the third connection while the transportable container is being offloaded.

2. The computer-implemented method of claim 1, wherein, upon switching from the second connection type to the third connection type, I/O communication is routed to the computing device via the third connection type enabling the remote computing device to wirelessly access the computing device during transportation of the transportation container to the third location.

3. The computer-implemented method of claim 2 further comprising replicating at least one of an application and data between the computing device and the remote computing device during transportation of the transportation container to at least one of the second and third location.

4. The computer-implemented method of claim 1 wherein the first connection type includes a physical LAN connection.

5. The computer-implemented method of claim 1 wherein the second connection type includes a wireless LAN connection.

6. The computer-implemented method of claim 2 wherein the third connection type includes a wireless WAN connection.

7. A computer program product residing on a computer readable storage medium having a plurality of instructions stored thereon which, when executed across one or more processors, causes at least a portion of the one or more processors to perform operations comprising:
identifying a first connection type at a first location, wherein a computing device resides in a transportable container coupled to the computing device and one or more storage devices, and wherein I/O communication is routed to the computing device via the first connection type;
identifying a second connection type at a second location, wherein the second location is a location where the first connection type is no longer available to the computing device; and
switching from the first connection type to the second connection type, wherein I/O communication is routed to the computing device via the second connection type enabling a remote computing device to wirelessly access the computing device during transportation of the transportation container to the second location;
identifying a third connection type at a third location, the third connection type being wireless;
identifying at least one of the first and second connection type at a fourth location;
switching from the second connection type to the third connection type;
switching from the third connection type to at least one of the first and second connection type in response to the transportable container moving within range of at least one of the first and second connection type and determining a current bandwidth of the third connection type is less than a current bandwidth of at least one of the first and second connection type; and
in response to identifying that the first connection type is available via a physical connection to the transportable container, switching from the third connection type to the first connection type and enabling, at least in part, receiving and sending of at least a second I/O communication through the first connection without being disconnected from the third connection while the transportable container is being offloaded.

8. The computer program product of claim 7, wherein, upon switching from the second connection type to the third connection type, I/O communication is routed to the computing device via the third connection type enabling the remote computing device to wirelessly access the computing device during transportation of the transportation container to the third location.

9. The computer program product of claim 8 wherein the operations further comprise replicating at least one of an application and data between the computing device and the remote computing device during transportation of the transportation container to at least one of the second and third location.

10. The computer program product of claim 7 wherein the first connection type includes a physical LAN connection.

11. The computer program product of claim 7 wherein the second connection type includes a wireless LAN connection.

12. The computer program product of claim 8 wherein the third connection type includes a wireless WAN connection.

13. A computing system including one or more processors and one or more memories configured to perform operations comprising:
identifying a first connection type at a first location, wherein a computing device resides in a transportable container coupled to the computing device and one or more storage devices, and wherein I/O communication is routed to the computing device via the first connection type;

identifying a second connection type at a second location, wherein the second location is a location where the first connection type is no longer available to the computing device; and switching from the first connection type to the second connection type, wherein I/O communication is routed to the computing device via the second connection type enabling a remote computing device to wirelessly access the computing device during transportation of the transportation container to the second location;

identifying a third connection type at a third location, the third connection type being wireless;

identifying at least one of the first and second connection type at a fourth location;

switching from the second connection type to the third connection type;

switching from the third connection type to at least one of the first and second connection type in response to the transportable container moving within range of at least one of the first and second connection type and determining a current bandwidth of the third connection type is less than a current bandwidth of at least one of the first and second connection type; and in response to identifying that the first connection type is available via a physical connection to the transportable container, switching from the third connection type to the first connection type and enabling, at least in part, receiving and sending of at least a second I/O communication through the first connection without being disconnected from the third connection while the transportable container is being offloaded.

14. The computing system of claim 13, wherein, upon switching from the second connection type to the third connection type, I/O communication is routed to the computing device via the third connection type enabling the remote computing device to wirelessly access the computing device during transportation of the transportation container to the third location.

15. The computing system of claim 14 wherein the operations further comprise replicating at least one of an application and data between the computing device and the remote computing device during transportation of the transportation container to at least one of the second and third location.

16. The computing system of claim 13 wherein the first connection type includes a physical LAN connection.

17. The computing system of claim 13 wherein the second connection type includes one of a wireless LAN connection and a wireless WAN connection.

* * * * *